Aug. 7, 1951       W. GROCOFF       2,563,237
BUTTER CUTTER
Filed June 2, 1947
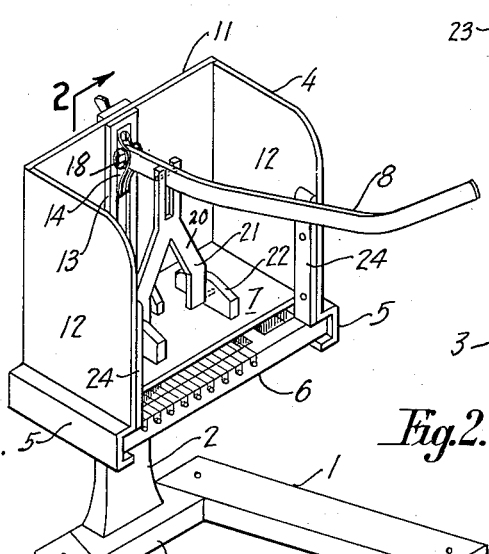
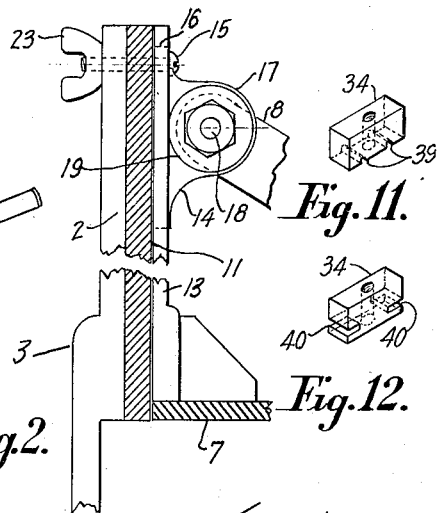
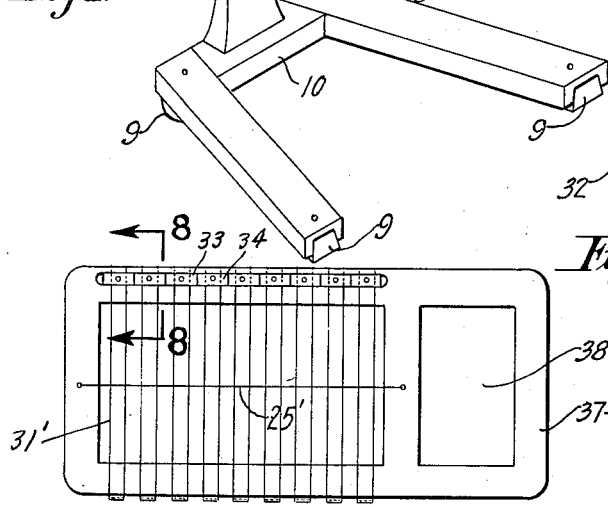
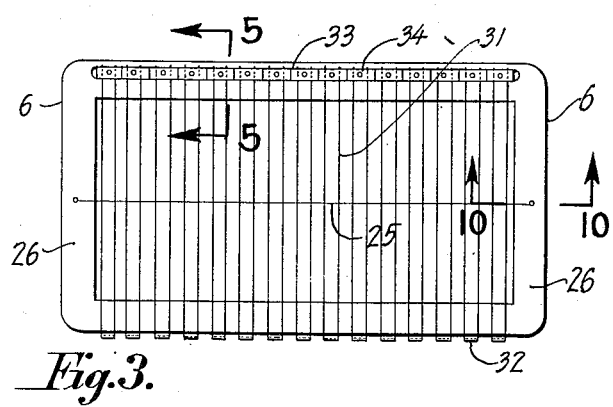
INVENTOR.
WILLIAM GROCOFF
BY
*A. Schapp*
ATTORNEY Patented Aug. 7, 1951

2,563,237

UNITED STATES PATENT OFFICE 2,563,237

BUTTER CUTTER

William Grocoff, San Francisco, Calif.

Application June 2, 1947, Serial No. 751,905

7 Claims. (Cl. 31—22)

The present invention relates to improvements in a butter cutter and its principal object is to provide a convenient means for cutting a conventionally shaped pound of butter into small squares adapted for serving in restaurants in a single operation.

The present butter cutter is an improvement over the butter cutter described and claimed in my co-pending application, Serial Number 643,515, filed January 26, 1946, issued August 23, 1949 as Patent No. 2,479,742, and this application may be considered a continuation in part of the former as far as common subject matter is concerned.

In the former application I disclosed a butter cutter comprising an open frame having cutting wires stretched thereacross and adapted to have a pound of butter placed thereon, a pressure plate superimposed on the pound of butter and lever-operated means bearing on the pressure plate to force the butter through the cutter frame.

In the present application it is proposed to provide certain improvements in the mounting means for the cutter frame and in the operating means for the pressure member.

It is further proposed to provide certain improvements in the cutter frame whereby the manufacture and repair of the latter is facilitated.

The shape of the conventional pound of butter manufactured in the eastern part of the United States differs somewhat from that used in the western part of the country, and it is proposed, in the present invention, to provide two forms of cutter frames, one adapted for eastern butter and the other for western butter, and both being adapted for use in the same machine.

Further objects and advantages of my invention will appear as the specification proceeds, and the novel features of my invention will be fully defined in the claims attached hereto.

The preferred form of my invention is illustrated in the accompanying drawing, in which:

Figure 1 shows a perspective view of my butter cutter,

Figure 2, an enlarged vertical section taken along line 2 of Figure 1,

Figure 3, a plan view of a cutter frame adapted for cutting western butter,

Figure 4, an enlarged fragmentary perspective edge view of the cutter frame,

Figure 5, an enlarged section taken along line 5—5 of Figure 3,

Figure 6, an enlarged perspective view of a plug used in the section of Figure 5, Figure 7, a plan view of a cutter frame adapted for cutting eastern butter, Figure 8, an enlarged section taken along line 8—8 of Figure 7, Figure 9, an enlarged perspective view of a plug used in the section of Figure 8, Figure 10, an enlarged section taken along line 10—10 of Figure 3, and Figures 11 and 12, enlarged perspective views of modified forms of the plug.

While I have shown only the preferred form of my invention, I wish to have it understood that various changes and modifications may be made within the scope of the claims attached hereto without departing from the spirit of the invention.

Referring to the drawing in detail, my butter cutter comprises in its principal features a base 1, a standard 2 rising therefrom, and off-set intermediate its height as at 3, a housing 4 supported by the upper portion of the standard and having two opposing guide channels 5, a cutter frame 6 slidable in the guide channels, a pressure plate 7 movable in the housing and a lever 8 having means for operating the pressure plate.

The base 1 is here shown as being V-shaped, supported on suction caps 9, with the standard 2 rising from the center of the end member 10 of the base.

The standard is off-set, intermediate its height, and carries, immediately above the off-set, the rear wall 11 of the housing, which latter has two forwardly projecting side flanges 12, the housing being dimensioned to accommodate a pound of western butter which is about 6⅝" long, 3⅛" wide and 1½" thick. The lower ends of the side flanges terminate in opposing channels 5 adapted to receive the cutter frame therein.

The pressure plate 7 corresponds to the inside dimensions of the housing and is disposed flatwise therein, with freedom of vertical sliding movement. The rear edge of the pressure plate has a slotted bar 13 rising therefrom, this bar being adapted to ride against the rear face of the housing and being guided by a bracket 14 secured upon the rear wall by a screw 15, the bracket comprising a plate 16 fitting in the slot and two ears 17 projecting from the plate. The lever 8 has its rear end pivoted between the ears, as at 18, and the pivot pin carries a pair of washers 19 which are dimensioned to bear against the slotted bar 13 to hold the latter against the rear wall as the bar moves up and down.

The lever 8 projects forwardly centrally of the housing and has a link 20 suspended therefrom, substantially at a point centrally of the housing, the link terminating in two legs 21 secured upon brackets 22 rising from the pressure plate, with freedom of pivotal motion.

Thus the pressure plate may be moved up and down by means of the lever 8, and the pressure plate, guide bar 13, bracket 14, lever 8 and link 20 may be removed as a unit for cleaning purposes, upon removal of the screw 15, which is held by a wing nut 23. A pair of bars 24 secured upon the front edges of the side flanges 12 guide the front edges of the pressure plate.

The frame 6, shown in detail in Figure 3, is dimensioned to have a sliding fit in the guide channels 5 and has a frame opening corresponding to the length and width of a pound of western butter.

A strand of piano wire 25 is stretched centrally across the length of the frame opening and is anchored to the end frame members 26.

The end members are formed, for this purpose, with shouldered apertures 27, each adapted to receive a threaded pin 28 in the upper portion and a nut 29 in the lower portion. The pin 28 has a transverse hole 30 adapted to have the end of the piano wire pass therethrough and to draw the same into the frame aperture when the nut is tightened upon the pin.

A plurality of cutting wires 31 are stretched transversely across the width of the frame. These wires are stretched in pairs so that, if one should snap or tear, it is only necessary to replace the single pair. Each pair comprises a single length of wire the central portion of which is looped around one of a series of buttons 32 provided upon the front frame member, while the two ends stretch across the frame in parallel relation and are anchored to the rear frame member.

For anchoring the ends of the wires I provide a groove 33 in the upper face of the rear frame member and a series of plugs 34 insertable in the groove in adjacent relation. Each plug has two holes 35 spaced to correspond to the desired spacing between the wires and adapted to receive the two ends of a wire therein. Upon insertion of the two ends the plug is pressed into the groove whereby the wire ends are forced into the groove. The plug may be drawn toward the bottom of the groove for further tensioning of the wire by means of a screw 36 insertable from below the frame and threaded into the plug.

Thus each wire, making up two strands, is anchored individually, and in case of breakage may be replaced individually.

The conventional eastern pound of butter is shaped somewhat different from the one previously described and requires a somewhat different method of handling. It is aproximately 4½″ long and 2½″ square in cross-section which makes it rather difficult to slice into numerous cubes in one operation. For cutting this shape of butter I provide two cutter frames, one of which is shown in Figure 7.

This frame 37 has the same length as the one previously described so as to fit into the guide channels 5, but a section 38 is blanked out to reduce the active frame opening to the proper proportion. A cutting wire 25' is stretched across the frame opening lengthwise and anchored in the same manner as previously described. Cross wires 31' are stretched across the width of the frame opening in the same manner as previously described, except that the anchoring means is slightly modified as shown in Figures 8 and 9, in which the wire ends are guided underneath the plugs and made to pass through apertures 35' in the outer wall of the groove.

A second frame (not shown) is provided for an initial cut, this frame being exactly like that shown in Figure 7, except that the cross wires are omitted.

In cutting the eastern pound I first use the second frame (with cross wires omitted) for cutting the pound lengthwise into two sections, each 1½″ thick. Then I use the frame shown in Figure 7 for slicing each section into the desired number of cubes.

The manner of operating the machine will be readily understood from the foregoing description. With the selected cutting frame in position in the guide channels 5 and the pressure plate 7 raised to a suitable height, the butter is interposed between the cutting frame and the pressure plate. The latter is then forced downward by operation of the lever 8 to force the butter through the cutter frame and to cut the butter into the desired number of slices.

Figures 11 and 12 show modified forms of the plug 34. In the form of Figure 11 spaced bottom slots 39 are substituted for the holes 35 for anchoring the ends of the wires, and in the form of Figure 12 end slots 40 are substituted for the same purpose. These plugs are somewhat easier to manufacture than the plugs with the holes 35.

I claim:

1. In a butter cutter of the character described, a frame having a pair of spaced frame members forming a frame opening, a cutting wire, a button mounted upon one of the frame members and having the central portion of the cutting wire looped around the same with the free ends of the wire projecting over the other frame member, the latter frame member having a groove therein, a plug in the groove having a pair of spaced apertures through which the free ends of the wire pass, and means for securing the plug in the groove with the apertures disposed within the depth of the groove.

2. In a butter cutter of the character described, a frame having a pair of spaced frame members forming a frame opening, a cutting wire, a button mounted upon one of the frame members and having the central portion of the cutting wire looped around the same with the free ends of the wire projecting over the other frame member, the latter frame member having a groove therein and having spaced apertures in one of the walls of the groove through which the ends of the wire extend, and a plug in the groove bearing upon the free ends of the wire for pressing the same into the groove.

3. In a butter cutter of the character described, a frame having a pair of spaced frame members forming a frame opening, a cutting wire, a button mounted upon one of the frame members and having the central portion of the cutting wire looped around the same with the free ends of the wire projecting over the other frame member, the latter frame member having a groove therein and having spaced apertures in one of the walls of the groove through which the ends of the wire extend, and a plug in the groove bearing upon the free ends of the wire for pressing the same into the groove, the plug having adjustable means for drawing the same toward the bottom of the groove.

4. In a butter cutter of the character described, a frame having a pair of spaced frame members forming a frame opening, a series of cutting wires, a series of buttons mounted upon one of the frame members and having central portions of the cutting wires looped around the same, with the free ends of the wires projecting over the other frame member, the latter frame member having a longitudinal groove therein substantially coextensive in length with the series of buttons, and a series of plugs mounted in the groove in abutting relation, each plug being made to anchor the free ends of one wire in the groove.

5. In a butter cutter of the character described, a frame having a pair of spaced frame members forming a frame opening, a series of cutting wires, a series of buttons mounted upon one of the frame members and having central portions of the cutting wires looped around the same, with the free ends of the wires projecting over the other frame member, the latter frame member having a longitudinal groove therein substantially coextensive in length with the series of buttons, and a series of plugs mounted in the groove in abutting relation, each plug being made to anchor the free ends of one wire in the groove, and the plugs being dimensioned and constructed to effect even spacing of the wires over the frame.

6. In a butter cutter of the character described, a frame having a pair of spaced frame members forming a frame opening, a series of cutting wires, a series of buttons mounted upon one of the frame members and having central portions of the cutting wires looped around the same, with the free ends of the wires projecting over the other frame member, the latter frame member having a longitudinal groove therein substantially coextensive in length with the series of buttons, and a series of plugs mounted in the groove in abutting relation, each plug being made to anchor the free ends of one wire in the groove, and one of the groove walls having apertures therein adapted for receiving the ends of the wires and for evenly spacing the same.

7. In a butter cutter of the character described, a frame having a pair of spaced frame members forming a frame opening, a cutting wire, a button mounted upon one of the frame members and having a central portion of the cutting wire looped around the same with the free ends of the wire projecting over the other frame member, the latter frame member having a groove therein with a wall element forming one side of the groove, a plug element in the groove, one of the said elements having spaced apertures through which the free ends of the wire pass, and means for securing the plug element in the groove with portions of the free ends of the wires clamped between the plug element and the walls of the groove.

WILLIAM GROCOFF.

REFERENCES CITED

The following references are of record in the file of this patent:

UNITED STATES PATENTS

| Number | Name | Date |
| --- | --- | --- |
| 608,368 | Lawson | Aug. 2, 1898 |
| 917,726 | Fulton | Apr. 6, 1909 |
| 1,027,020 | Waters | May 21, 1912 |
| 1,043,472 | Shaw | Nov. 5, 1912 |
| 1,076,130 | Lombardi | Oct. 21, 1913 |
| 1,092,457 | Schoenberg | Apr. 7, 1914 |
| 1,135,005 | Franke | Apr. 13, 1915 |
| 1,178,219 | Cramer | Apr. 4, 1916 |
| 1,249,513 | Scanlan | Dec. 11, 1917 |
| 1,496,494 | Selvig | June 3, 1924 |
| 1,595,341 | Libi | Aug. 10, 1926 |
| 1,658,675 | Frank | Feb. 7, 1928 |
| 1,714,494 | Case | May 28, 1929 |
| 1,714,495 | Case | May 28, 1929 |
| 1,897,418 | Carlson | Feb. 14, 1933 |
| 1,981,685 | Blackburn et al. | Nov. 20, 1934 |
| 2,114,277 | Bloomfield | Apr. 19, 1938 |